(12) United States Patent
Takahashi et al.

(10) Patent No.: US 7,028,997 B2
(45) Date of Patent: Apr. 18, 2006

(54) VIBRATION DAMPING TOOL

(75) Inventors: Hidebumi Takahashi, Saitama (JP); Yoichi Ishikawa, Saitama (JP)

(73) Assignee: Mitsubishi Materials Corporation, (JP)

( * ) Notice: Subject to any disclaimer, the term of this patent is extended or adjusted under 35 U.S.C. 154(b) by 0 days.

(21) Appl. No.: 10/101,692

(22) Filed: Mar. 21, 2002

(65) Prior Publication Data

US 2002/0190449 A1    Dec. 19, 2002

(30) Foreign Application Priority Data

Jun. 13, 2001 (JP) .......................... P2001-178768
Jun. 13, 2001 (JP) .......................... P2001-178769

(51) Int. Cl.
  *F16M 1/00*    (2006.01)
  *B23B 29/02*   (2006.01)

(52) U.S. Cl. ..................... 267/137; 408/143; 409/141; 82/158

(58) Field of Classification Search ................ 267/137, 267/141, 125; 188/379; 408/143; 409/141; 82/158; B23B 29/02
See application file for complete search history.

(56) References Cited

U.S. PATENT DOCUMENTS

| 3,598,498 | A | * | 8/1971 | Holmen ....................... 408/143 |
| 3,601,229 | A |   | 8/1971 | Shurtliff |
| 3,642,378 | A |   | 2/1972 | Hahn et al. |
| 3,643,546 | A | * | 2/1972 | Richter et al. ............... 409/141 |
| 4,491,044 | A |   | 1/1985 | Haas et al. |
| 4,553,884 | A |   | 11/1985 | Fitzgerald et al. |
| 4,706,788 | A |   | 11/1987 | Inman et al. |
| 4,998,851 | A | * | 3/1991 | Hunt .......................... 408/143 |
| 5,029,677 | A |   | 7/1991 | Mitsui |
| 5,095,786 | A |   | 3/1992 | Bellinghausen et al. |
| 5,413,318 | A |   | 5/1995 | Andreassen |
| 5,902,656 | A |   | 5/1999 | Hwang |
| 5,957,016 | A |   | 9/1999 | Segalman et al. |
| 6,345,942 | B1 |   | 2/2002 | Cook |

FOREIGN PATENT DOCUMENTS

| GB | 1130132 | | 10/1968 |
| JP | 55-134108 | | 9/1980 |
| JP | 61-076251 | | 4/1986 |
| JP | 05228707 | A * | 9/1993 |
| JP | 6-23605 | | 2/1994 |
| JP | 06023606 | A * | 2/1994 |
| JP | 06031507 | A * | 2/1994 |

* cited by examiner

*Primary Examiner*—Xuan Lan Nguyen
(74) *Attorney, Agent, or Firm*—Rader, Fishman & Grauer PLLC (57) ABSTRACT

A vibration damping tool having the following structure is provided. In the vibration damping tool, a hollow portion is formed in the interior of the distal end portion of a tool body and one end of a weight member is connected to the inner wall surface of the distal end side of this hollow portion. A gap created between the outer peripheral surface of the weight member and the inner wall surface of the hollow portion is filled with a visco-elastic body. The one end of the weight member is formed as a narrow diameter shaft portion. The tool body can be divided into two and freely removed from and reattached at a dividing surface located on the base end side of the hollow portion. A hole portion is formed inside the other end of the weight member by hollowing out the interior thereof. Chatter vibration is thus absorbed using a simple structure without there being any effects from heat generated during cutting processing.

13 Claims, 4 Drawing Sheets

VIBRATION DAMPING TOOL

BACKGROUND OF THE INVENTION

1. Field of the Invention

The present invention relates to a vibration damping tool that is able to suppress vibration generated during a process to machine cut a material.

2. Description of the Related Art

Conventionally, a head portion on which inserts are mounted is attached to a tool body, for example, such as an arbor. A material to be cut may be cut by moving the tool body forward while rotating it around an axis. Alternatively, an insert may be attached to the distal end of a tool body such as a boring bar and the material to be cut may be cut as it is rotated around an axis.

At this time, the base end of the tool body is supported in a cantilever manner by a gripping portion of a machine tool and when a cutting processing is performed on the material to be cut using the cutting edge of an insert, resonance is created from the natural vibration of the tool that derives from the projecting length of the tool from the gripping portion to the blade and the like and vibration that acts on the tool as a result of cutting force and the like, and cutting edge vibration is thereby generated. This chatter vibration worsens as the ratio L/D, which is the length L that the tool body projects outwards relative to the diameter D of the tool body, increases, leading to a deterioration in the surface roughness of the processed surface of the material being cut, or in severe cases, may lead to a breakage of the tool body itself. Therefore, an upper limit value of approximately 3 to 4 is set for the ratio L/D, which has created problems particularly when an increase in the ratio L/D is desired such as, for example, in deep groove processing of a metal die or in boring processing using a boring bar.

In order to solve the above described problem, as is disclosed in Japanese Patent Application Laid-Open (JP-A) No. 11-19839, for example, the material used for the tool body may be formed from a material having a high Young's modulus. Alternatively, as is disclosed in Japanese Patent Application Laid-Open (JP-A) No. 9-94706, a cemented carbide member may be fixed to the outer peripheral portion of the tool body along an axial direction thereof by brazing.

In tools such as these, by increasing the rigidity of the tool body, the aim is to raise the undamped natural frequency of the tool body and thereby make it difficult for resonance to be generated. However, because chatter vibration increases as the ratio L/D increases, a fundamental solution has hitherto not been possible.

As another means of solving this problem, as is disclosed in Japanese Patent Application Laid-Open (JP-A) No. 59-1106, for example, a hollow portion is formed inside the tool body and a weight member, which is elastically supported by two elastic members forming a ring shape, is housed in this hollow portion. In addition, a viscous fluid such as silicone oil is sealed in the hollow portion so as to fill the gap between the weight member and the inner wall surface of the hollow portion.

FIG. 10 shows an example in which this type of structure is used in a rotation cutting tool. Chatter vibration generated in the tool body 100 excites vibration in a weight member 102 that is elastically supported by elastic members 101 and 101. Subsequently, the vibration of the weight member 102 is damped by being transmitted to viscous fluid 103 that fills the area around the weight member 102. As a result, chatter vibration of the tool body 100 is suppressed. Namely, this tool body 100 is provided with a dynamic vibration absorber made up from a weight member 102 forming a mass element, elastic members 101 and 101 forming spring elements, and viscous fluid 103 forming a damping element. Accordingly, vibration of the tool body 100 is damped and absorbed by the dynamic vibration absorber.

However, the viscous fluid 103 that is used as a damping element in the dynamic vibration absorber has a drawback in that it is easily affected by heat so that the viscosity thereof changes. When heat that is generated during cutting is transmitted to the viscous fluid 103 and the temperature of the viscous fluid 103 itself increases, the viscosity deteriorates and the damping affect also deteriorates causing concern that chatter vibration will not be able to be suppressed.

Moreover, a sealed structure is needed in order to ensure that the viscous fluid is sealed inside the tool body and does not leak out, which necessarily entails a complicated structure for the tool body 100.

Furthermore, because a structure is employed in which the weight member 102 is supported by the elastic members 101 and 101, when a tool body 100 that is provided with this type of dynamic vibration absorber is used as a rotation cutting tool, because eccentricity is generated in the weight member 102 as a result of the rotation of the tool body 100, problems such as it becoming necessary to lower the rotation speed occur which mean that this structure is not suitable for use as a rotation cutting tool.

SUMMARY OF THE INVENTION

The present invention was conceived in view of the above problems and it is an aim thereof to provide a vibration damping tool that is able to suppress chatter vibration utilizing a simple structure that is not affected by heat generated during cutting processing, and that enables the ratio L/D of the projecting length L relative to the diameter D of the tool body to be enlarged further.

In order to solve the above described problems and achieve the above objectives, according to the present invention, there is provided a vibration damping tool in which: a hollow portion is formed inside a tool body on whose distal end portion is provided processing means for processing a material to be cut; one end of a weight member connects to an inner wall surface of the hollow portion, and a gap is formed between the inner wall surface of the hollow portion and portions of the weight member other than the connecting portion, and at least a portion of this gap is filled with a visco-elastic body; and a dynamic vibration absorber is formed by the weight member and the visco-elastic body that damps and absorbs vibration of the tool body.

By employing the above described structure, if chatter vibration is generated in a tool body during the cutting process of a material to be cut, a weight member serving as a mass element and a spring element of a dynamic vibration absorber vibrates in a substantially opposite phase to the vibration of the tool body that has one end thereof serving as a fixed end by being connected to the inner wall surface of the hollow portion. The vibration of this weight member is transmitted to a visco-elastic body serving as a damping element that fills a gap created between the weight member and the inner wall surface of the hollow portion and is damped. Ultimately, the chatter vibration is suppressed by the vibration energy of the weight member being converted into progressive heat energy and dissipated.

Here, by using a visco-elastic body as the damping element in the dynamic vibration absorber, a better damping effect is obtained using a smaller mass than is obtained from a viscous fluid. In addition, because there is no fear that the visco-elastic body will be affected by the heat generated during the cutting processing, the damping properties at the design stage of the dynamic vibration absorber can be stably maintained. Furthermore, there is no need to employ a sealed structure in order to seal the viscous fluid, thereby enabling a dynamic vibration absorber having a simple structure to be obtained.

Moreover, because a structure is employed in which one end of the weight member is connected to the inner wall surface of the hollow portion and thereby forms an integral structure with the tool body, even if the present invention is employed as a rotation cutting tool, there is no fear of the mass becoming eccentric.

Furthermore, the present invention is characterized in that the hollow portion is formed so as to extend from the distal end portion along an axial direction of the tool body.

By employing the above structure, a dynamic vibration absorber formed by a weight member and a visco-elastic body is provided at the distal end portion of a tool where the chatter vibration amplitude is enlarged. As a result, the damping force at the distal end portion of the tool body can be made to operate effectively, and chatter vibration can be effectively suppressed.

Furthermore, the present invention is characterized in that one end of the weight member connects to an inner wall surface on either the distal end side or base end side of the hollow portion.

Because the main vibration in the chatter vibration is a vibration in a direction orthogonal to the axis of the tool body, by connecting the weight member to the inner wall surface on the distal end side or base end side of the hollow portion, vibration is easily generated in a direction orthogonal to the axis enabling the damping effect to be increased.

Furthermore, the present invention is characterized in that one end of the weight member is formed as a narrow diameter shaft.

By employing the above structure, flexure is easily generated in the small diameter shaft portion (i.e., in one end) of the weight member so that vibration is easily excited in the weight member. Moreover, the setting of the undamped natural frequency of the dynamic vibration absorber can be made easily and over a wide range. Therefore, it is possible to apply the present invention in tool bodies having a variety of undamped natural frequencies.

Furthermore, the present invention is characterized in that the other end of the weight member on the opposite side to the end connecting to the inner wall surface also connects to the inner wall surface.

By employing the above structure, the weight member is fixed to the tool body by the both ends of the weight member. Therefore, vibration is excited in the weight member with the two ends as fixed ends and the central portion of the weight member as the loop of the vibration. This vibration mode is a higher order vibration mode than a vibration in which the fixed end is the node of the vibration and the free end is the loop of the vibration, and higher order chatter vibration in resonance with a high frequency chatter vibration is effectively suppressed.

Furthermore, a hole portion is formed by hollowing out an interior portion of an end of the weight member on the opposite side to the end of the weight member that connects to the inner wall surface, and a dynamic vibration absorber is formed by the weight member and the visco-elastic body so as to damp and absorb vibration of the tool body.

Because a hole portion is formed by hollowing out the interior of the end of the weight member on the opposite side to the end of the weight member that is connected to the inner wall surface on the distal end side of the hollow portion, the center of gravity of the weight member tends towards the distal end side of the tool body, namely, towards the distal end side of the tool body that has the larger chatter vibration amplitude. Therefore, the effect of suppressing the chatter vibration is heightened.

Moreover, by forming a hole portion in the weight member, the surface area of the outer peripheral surface thereof is increased compared with a weight member having the same mass in which no hole portion is formed. As a result, because a sufficient gap for filling with the visco-elastic body can be ensured, when the damping effect is insufficient, this can be supplemented by filling the gap with more of the visco-elastic body.

Furthermore, the present invention is characterized in that the tool body has a shaft portion that reaches as far as an interior of the hole portion, and at least a portion of a gap between the shaft portion and the hole portion is filled with the visco-elastic body.

Because the amplitude of the weight member vibrating in resonance with the chatter vibration increases the further from the connected end, when the visco-elastic body forming a damping element fills the hole portion formed in the other end of the weight member having a large amplitude, the vibration energy of the chatter vibration that is converted into heat increases. Therefore, it is possible to obtain an excellent damping effect even when only a small amount of the visco-elastic body is employed.

Furthermore, the present invention is characterized in that the tool body can be divided, and be freely removed from and reattached at a position on the base end side of the hollow portion.

If the above described structure is employed, by removing the distal end side portion of the tool body that contains the dynamic vibration absorber and directly attaching a processing means to the base end side portion of the tool body, it is possible for the tool body to be used as a tool having a short projecting length.

Furthermore, the present invention is characterized in that the weight member is formed from a high density material.

By employing the above structure, because the size of the weight member can be reduced while the mass thereof is maintained, it is possible to correspondingly reduce the size of the hollow portion that is formed in the tool body, thereby enabling the rigidity of the tool body to be maintained at a high level.

The above and other objects and features of the present invention will become more apparent from the following description taken in conjunction with the accompanying drawings.

DESCRIPTION OF THE PREFERRED EMBODIMENTS

Preferred embodiments of the present invention will now be described with reference made to the attached drawings.

Figure 1A:
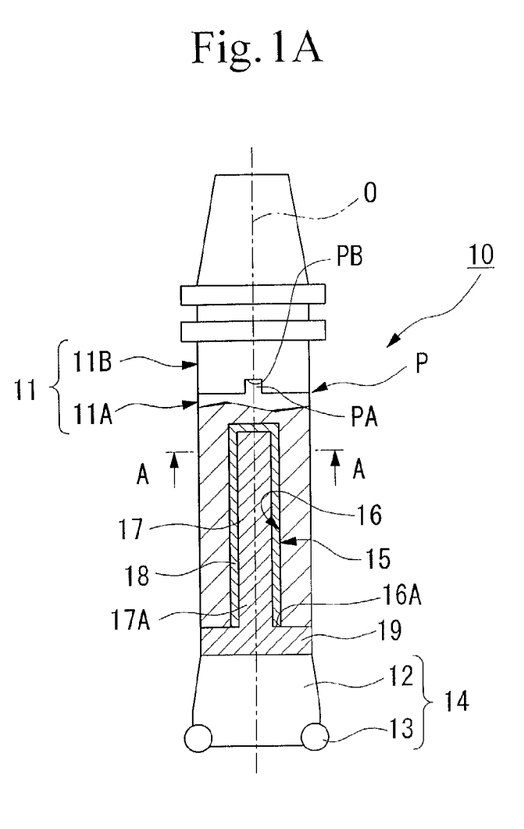
FIG. 1A is a partial sectional side view of the vibration damping tool according to the first embodiment of the present invention.
Figure 1B:
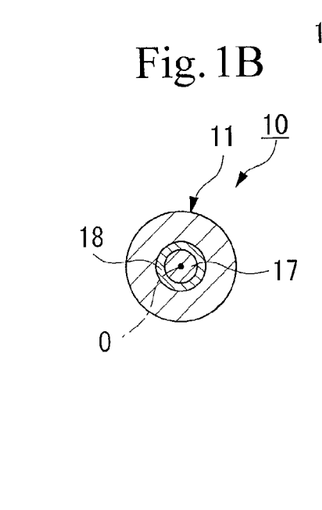
FIG. 1B is a cross-sectional view taken along the line A—A in FIG. 1A.

FIG. 1A is a side view of the vibration damping tool according to the first aspect of the present invention, and FIG. 1B is a cross-sectional view taken along the line A—A in FIG. 1A.

As is shown in FIG. 1, the vibration damping tool (referred to below as a damping tool) 10 according to the first embodiment is a rotation cutting tool that is formed mainly by a tool body 11 and a head portion 14 (i.e., a processing means). The tool body 11 is made from steel, for example, and has a base end supported in a cantilever fashion by a gripping portion of a machine tool. The tool body 11 has a substantially cylindrical configuration and is rotated around an axis O. The head portion 14 has a plurality of inserts 13 mounted on the outer periphery of a distal end of a head body 12.

As is shown in FIG. 1, the head portion 14 is removably mounted by a connecting screw (not shown) on the distal end portion of the tool body 11 coaxially with the axis O. The head portion 14 is mounted such that a cutting edge of each insert 13 protrudes on the distal end side and also on the outer peripheral side of the damping tool 10.

A substantially cylindrically shaped hollow portion 15 is formed inside the distal end portion of the tool body 11 on which the head portion 14 is mounted. The hollow portion 15 extends from the distal end portion along the axis O of the tool body 11. A substantially cylindrically shaped weight member 17 made from steel like the tool body 11 and having an outer diameter smaller than the inner diameter of the hollow portion 15 is housed inside the hollow portion 15 with a gap between the weight member 17 and an inner wall surface 16 of the hollow portion 15. In addition, one end 17A in the axial direction of the weight member 17 is connected to an inner wall surface 16A on the distal end side of the inner wall surface 16 of the hollow portion 15. The weight member 17 is structured so as to be integral with the tool body 11. The weight member 17 is connected such that the axis thereof is coaxial with the axis O of the tool body 11.

At least a portion of a gap formed between portions of the weight member 17 other than the connecting portion of the end 17A that is connected to the inner wall surface 16A and the inner wall surface 16 of the hollow portion 15 are filled by a visco-elastic body 18. In the present embodiment, the entire gap that is formed between the weight member 17 and the inner wall surface 16 is filled by the visco-elastic body 18.

The material used for the visco-elastic body 18 is suitably one having a Young's modulus (using a standard hardness article having a speed of 50 mm/min) of not more than 1000 (kPa) a penetration (hardness) as prescribed by JIS K 2207 of 20 to 300 (¹/₁₀ mm), a tensile strength as prescribed by JIS K 6251 of 1 to 4000 (kPa), and an elongation as prescribed by JIS K 6251 of 50 to 800%. More preferably, the material suitably has a Young's modulus of less than 100 (kPa), a penetration of 100 to 180 (¹/₁₀ mm), a tensile strength of 1 to 100 (kPa), and an elongation of 200 to 400%. In the present embodiment, the visco-elastic body 18 used has a Young's modulus of 13 (kPa), a penetration of 150 (¹/₁₀ mm), a tensile strength of 30 (kPa), and an elongation of 340%.

Here, the hollow portion 15 is formed by providing a hole that is coaxial with the axis O running from the distal end of the tool body 11 towards the base end side, and blocking this hole through a bolting or brazing process using a base plate 19 to which is attached the weight member 17 around which is wrapped the visco-elastic body 18. Accordingly, the tool body 11 can be handled as a single integral unit with the weight member 17 and the visco-elastic body 18 contained therein.

At this time, the thickness of the visco-elastic body 18 wrapped around the weight member 17 of the base plate 19 is made slightly larger than the thickness of the gap formed between the outer peripheral surface of the weight member 17 and the inner wall surface 16 of the hollow portion 16 when the weight member 17 and the visco-elastic body 18 are housed within the hollow portion 15. Namely, when the weight member 17 and the visco-elastic body 18 are housed inside the hollow portion 15, the visco-elastic body 18 is under a slight degree of compression.

Furthermore, the tool body 11 can be divided into a portion 11A on the distal end side and a portion 11b on the base end side. The distal end side portion 11A contains the hollow portion 15 and is bordered by a dividing surface P that is orthogonal to the axis O and is located further to the base end side than the hollow portion 15. The distal end side portion 11A and the base end side portion 11B can be freely attached to and separated from each other. A key portion PA having a square cross section in a direction orthogonal to the axis O is formed in the dividing surface P of the distal end side portion 11A. At the same time, a key groove PB into which can be fitted the key portion PA is formed in a direction orthogonal to the axis O in the dividing surface P of the base end side portion 11B. After the key portion PA has been fitted together with the key groove PB, the distal end side portion 11A is tightly fastened to the base end side portion 11B by bolts, for example, so as to form a single unit.

The damping tool 10 according to the first embodiment has the above described structure. The operation thereof will now be described.

The tool body 11, on whose distal end portion the head portion 14 has been mounted, is supported by the base end thereof in a cantilever manner in a gripping portion of a machine tool. Here, because one end of the weight member 17 is fixed so that the weight member 17 is coaxial with and made integral with the tool body 11, the tool body 11 does not enter into a state of eccentricity even when rotated, and when the damping tool 10 is rotated during cutting processing, a stable rotation state can be maintained.

In this way, if the cutting edge of the inserts 13 are made to travel forward towards the distal end side in the direction of the axis O towards the material to be cut in order to begin the cutting processing, chatter vibration is generated in a direction orthogonal to the direction of the axis O of the tool body 11 due to cutting force. At this time, the weight member 17 that is connected to the inner wall surface 16A on the distal end side of the hollow portion 15 resonates, and a substantially opposite phase vibration from the vibration of the tool body 11 begins in a direction orthogonal to the axis O with the connected end 17A of the weight member 17 as a fixed end.

Consequently, the vibration of the weight member 17 is transmitted to the visco-elastic body 18 filling the gap between the weight member 17 and the inner wall surface 16 of the hollow portion 15, and is thereby damped. Ultimately, the chatter vibration of the tool body 11 is suppressed as a result of the energy of the chatter vibration being converted into progressive heat energy and dissipated.

Namely, in the first embodiment, a dynamic vibration absorber formed by a weight member 17 forming a mass element and spring element and a visco-elastic body 18 forming a damping element is provided within the tool body 11 of the damping tool 10, and chatter vibration is damped and absorbed by this dynamic vibration absorber.

Here, in the design of a dynamic vibration absorber such as that described above, care is taken that the following formulas apply.

As regards the undamped natural frequency $\omega$ of the dynamic vibration absorber (i.e., the undamped natural frequency of the weight member), the following formula applies:

$\omega/\Omega = 1/(1+\mu)$ wherein, $\Omega$: undamped natural frequency of the tool body $\mu$: equivalent mass ratio (=m/M)

M: equivalent mass of the tool body m: equivalent mass of the dynamic vibration absorber (i.e., the equivalent mass of the weight member).

As regards the damping coefficient C of the dynamic vibration absorber, the following formula applies:

$$C = Cc \times (3\mu/(8(1+\mu)^3))^{1/2} \ (Cc = 2(mk)^{1/2}) \text{ wherein,}$$

k: spring constant of the dynamic vibration absorber (i.e., the spring constant of the weight member).

The adjustment of the damping coefficient C and the undamped natural frequency $\omega$ of the dynamic vibration absorber is achieved by causing the size and configuration of the weight member 17 to change and by causing the volume of the visco-elastic body 18 to change. If a dynamic vibration absorber that has been designed so that the above formulas apply is used, then the dynamic vibration absorber is able to operate to effectively suppress vibration from all external forces.

If an attempt is made to increase the damping coefficient C of the visco-elastic body 18 and heighten the damping effect by increasing the thickness of the visco-elastic body 18, after a certain point saturation is reached. Therefore, in order to increase the damping coefficient C of the visco-elastic body 18 and heighten the damping effect, it is more effective to increase the surface area of the visco-elastic body 18 that is in contact with the weight member 17.

According to the damping tool 10 of the first embodiment, because the weight member 17 vibrates in a substantially opposite phase from the chatter vibration of the tool body 11, and because the visco-elastic body 18 damps and absorbs that vibration, the chatter vibration can be absorbed. For this reason, even if the ratio L/D of the projecting length L of the tool body 11 relative to the diameter D thereof is increased, there is no deterioration in the surface roughness of the processed surface nor is there any damage to the tool body 11. No problems thus occur even, for example, in metal die deep groove processing in which the ratio L/D is set at a comparatively large value.

Moreover, the amplitude of this chatter vibration increases the closer to the distal end side of the tool body 11 and the vibration in a direction orthogonal to the axis O of the tool body 11 becomes the main vibration. However, in contrast to this, because the hollow portion 15 is formed inside the distal end portion of the tool body 11 and a dynamic vibration absorber is provided therein, and because the end 17A of the weight member 17 is connected coaxially with the axis O to the inner wall surface 16A on the distal end side of the hollow portion 15 and the weight member 17 thus has a tendency to vibrate in a direction orthogonal to the axis O, it is possible to effectively suppress this chatter vibration in the vicinity of the head portion 14 (i.e., the distal end portion), which has a large chatter vibration amplitude.

In addition, because the visco-elastic body 18 is used as a damping element in the dynamic vibration absorber, a higher damping effect can be obtained from a lesser amount than is obtained from a viscous fluid. In addition, because there is no fear that the visco-elastic body 18 will be affected by heat generated in the cutting process, the damping properties at the design stage of the dynamic vibration absorber can be stably maintained. Furthermore, there is no need to employ a sealed structure in order to prevent leakages and or to employ measures to prevent oxidation, as is the case when a viscous fluid is used, thereby enabling a damping tool 10 having a simple structure to be obtained.

Moreover, because the end 17A of the weight member 17 is connected coaxially with the tool body 11 to the inner wall surface 16A on the distal end side of the hollow portion 15 and the weight member 17 and tool body 11 are thus formed as an integral structure, even if the damping tool 10 according to the first embodiment is employed as a cutting tool and is rotated around the axis O, the centrifugal force of this rotation does not cause the weight member 17 to become eccentric and ensures that a stable rotation state can be maintained.

Furthermore, in the first embodiment, because the tool body 11 can be divided at the dividing surface P into a base end side portion 11B and a distal end side portion 11A having the hollow portion 15, and because these two portions can be freely separated from or attached to each other, it is possible in cases when there is no need to increase the ratio L/D to remove the distal end side portion 11A having the hollow portion 15, namely, the distal end side portion 11A that is provided with the dynamic vibration absorber and then attach the head portion 14 directly to the base end side portion 11B. This enables the projecting length to be altered without the base end of the tool body 11 having to be removed from the gripping portion of the machine tool.

In cases such as this, because the ratio L/D is not increased, no chatter vibration is generated and no problem is created as a result of not employing the dynamic vibration absorber.

Figure 2:
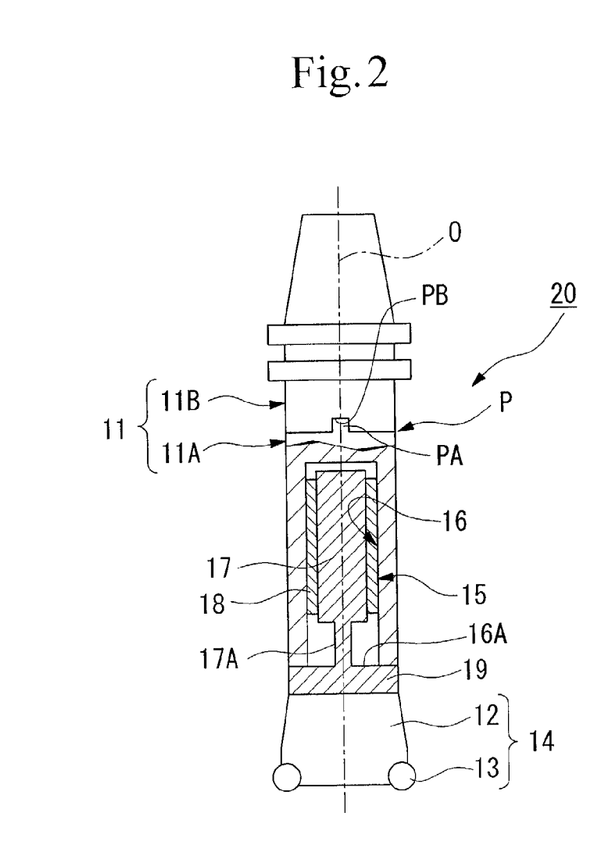
FIG. 2 is a partial sectional side view of the vibration damping tool according to the second embodiment of the present invention.

A description will now be given of the second embodiment of the present invention. Portions thereof that are the same as in the above described first embodiment are given the same descriptive symbols and a description thereof is omitted. FIG. 2 is a partial sectional side view of the vibration damping tool according to the second embodiment.

As is shown in FIG. 2, in the damping tool 20 according to the second embodiment, the end 17A of the weight member 17 presents a shaft portion having a narrow diameter that is coaxial with the axis O of the tool body 11. The weight member 17 is connected to the inner wall surface 16A of the distal end side of the hollow portion 15 by this end 17A presenting the narrow diameter shaft portion. In this damping tool 20, the visco-elastic body 18 fills a gap between an outer peripheral surface that is shaped as a circular cylinder of the weight member 17 other than the end 17A and the inner wall surface 16 of the hollow portion 15, however, it is also possible to decrease the amount thereof used to fill this gap or to fill the rest of the gap depending on the design of the dynamic vibration absorber.

According to the damping tool 20 having the above described structure, flexure is easily generated in the small diameter shaft portion (i.e., the end 17A) of the weight member 17 so that vibration is easily excited in the weight member 17. Moreover, the setting of the undamped natural frequency ω of the dynamic vibration absorber, namely, of the equivalent mass m and the spring constant k can be made easily and over a wide range. Therefore, the effect is secured that chatter vibration is suppressed in tool bodies 11 having a variety of undamped natural frequencies Ω.

Figure 3:
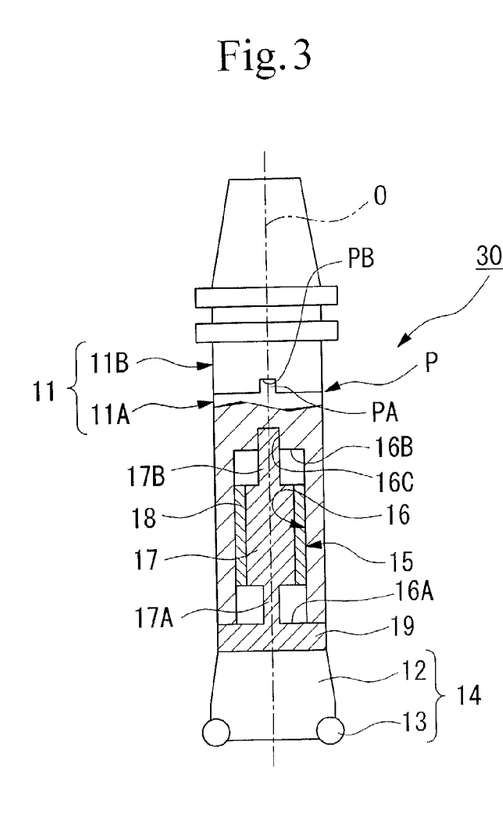
FIG. 3 is a partial sectional side view of the vibration damping tool according to the third embodiment of the present invention.

A description will now be given of the damping tool according to the third embodiment of the present invention. Portions thereof that are the same as in the above described first and second embodiments are given the same descriptive symbols and a description thereof is omitted. FIG. 3 is a partial sectional side view of the vibration damping tool according to the third embodiment.

As is shown in FIG. 3, in the damping tool 30 according to the third embodiment, the end 17A of the weight member 17 presents a shaft portion having a narrow diameter and is also fixed to the inner wall surface 16A on the distal end side of the hollow portion 15. In addition, the other end 17B on the opposite side from the end 17A also presents a shaft portion having a narrow diameter and is also fixed to the inner wall surface 16B on the base end side of the hollow portion 15. Here, when the weight member 17 and the visco-elastic body 18 are inserted in the hollow portion 15 together with the base plate 19, the end 17B of the weight member 17 is fitted together with a support hole 16C provided in the inner wall surface 16B on the base end side by being inserted into this hole.

According to the damping tool 30 having the above described structure, both ends 17A and 17B of the weight member 17 are formed having narrow diameter shaft portions and the weight member 17 is fixed integrally to the tool body 11 by the two ends 17A and 17B. Therefore, when chatter vibration is generated in the tool body 11, vibration is excited in the weight member 17 with the two ends 17A and 17B as fixed ends and the central portion of the weight member 17 as the loop of the vibration.

Here, flexure is easily generated in the two ends 17A and 17B so that vibration is easily excited in the weight member 17.

Furthermore, the vibration mode excited in the weight member 17 is a higher order vibration mode than a vibration in which the fixed end is the node of the vibration and the free end is the loop of the vibration, and it is possible to effectively suppress higher order chatter vibration resonating with a high frequency chatter vibration.

Figure 4A:
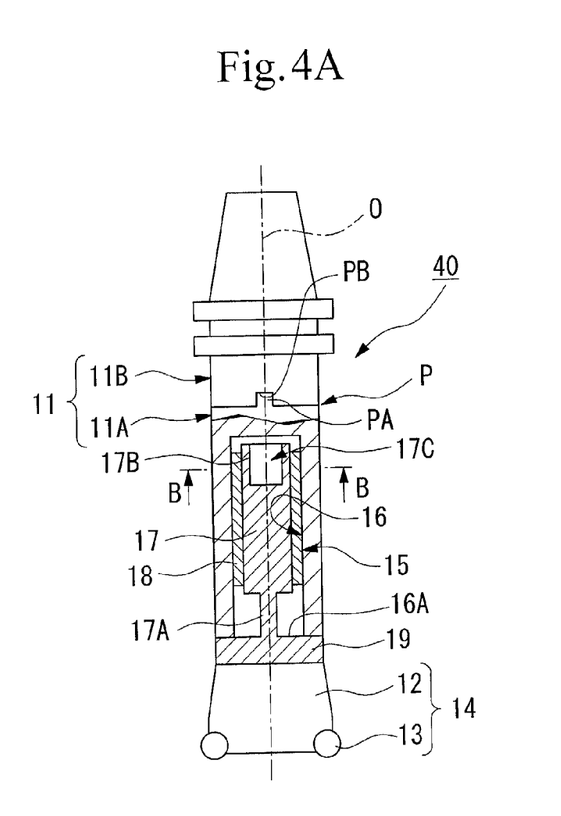
FIG. 4A is a partial sectional side view of the vibration damping tool according to the fourth embodiment of the present invention.
Figure 4B:
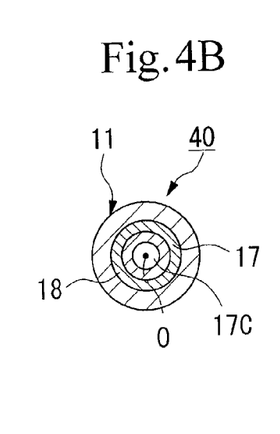
FIG. 4B is a cross-sectional view taken along the line B—B in FIG. 4A.

A description will now be given of the damping tool according to the fourth embodiment of the present invention. Portions thereof that are the same as in the above described first through third embodiments are given the same descriptive symbols and a description thereof is omitted. FIG. 4 is a partial sectional side view of the vibration damping tool according to the fourth embodiment.

As is shown in FIG. 4, the damping tool 40 according to the fourth embodiment has substantially the same structure as the damping tool 20 according to the second embodiment. It differs, however, in that the interior of the end 17B of the weight member 17, which is on the opposite side to the end 17A that is connected to the inner wall surface 16A on the distal end side of the hollow portion 15, is hollowed out, and a further hollow hole portion 17C having a substantially cylindrical configuration is formed coaxially with the axis O of the tool body 11.

In this damping tool 40 the visco-elastic body 18 is made to fill the gap between the cylindrical outer peripheral surface of the weight member 17 apart from the end 17A and the inner wall surface 16 of the hollow portion 15, however, it is also possible to decrease the amount of the fill or to fill the remainder of the gap in accordance with the dynamic vibration absorber design.

According to the damping tool 40 of the fourth embodiment, because a hole portion 17C is formed by hollowing out the interior of the end 17B on the opposite side to the end 17A of the weight member 17 that is connected to the inner wall surface 16A on the distal end side of the hollow portion 15, the center of gravity of the weight member 17 tends towards the distal end side of the tool body 11, namely, towards the distal end side of the tool body 11 where the chatter vibration amplitude is large. Therefore, the effect of suppressing the chatter vibration is heightened.

Moreover, as described above, in order to increase the damping coefficient C of the visco-elastic body 18 and heighten the damping effect, it is more effective if, instead of increasing the thickness of the visco-elastic body 18, the amount of the visco-elastic body 18 that is in contact area with the weight member 17 is increased. Therefore, as in the sixth embodiment, if the hole portion 17C is formed in the weight member 17, it is possible to ensure a large surface area for the cylindrically shaped outer peripheral surface of the weight member 17. As a result, when the damping effect of the dynamic vibration absorber is insufficient, this can be supplemented by filling the gap with more of the visco-elastic body 18 and thereby enlarging the surface area thereof that is in contact with the cylindrically shaped outer peripheral surface of the weight member 17.

Figure 5:
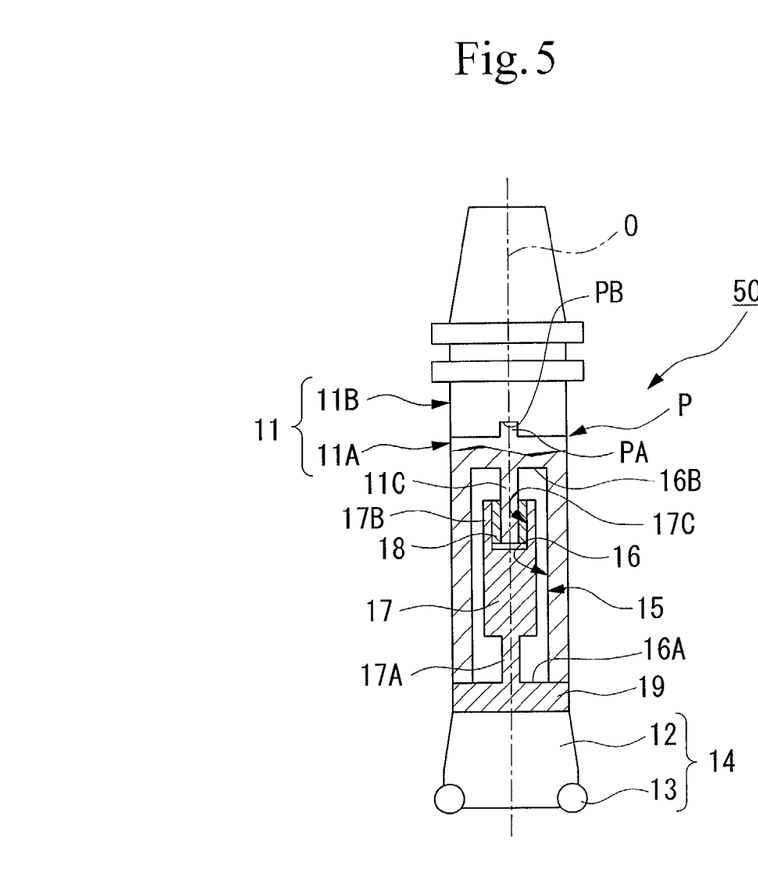
FIG. 5 is a partial sectional side view of the vibration damping tool according to the fifth embodiment of the present invention.

A description will now be given of the damping tool according to the fifth embodiment of the present invention. Portions thereof that are the same as in the above described fourth embodiment are given the same descriptive symbols and a description thereof is omitted. FIG. 5 is a partial sectional side view of the vibration damping tool according to the fifth embodiment.

As is shown in FIG. 5, in the damping tool 50 according to the fifth embodiment the tool body 11 protrudes coaxially with the axis O from the inner wall surface 16B on the base end side of the hollow portion 15. In addition, there is provided a shaft portion 11C that reaches as far as the inside of the hole portion 17C formed in the end 17B of the weight member 17. A visco-elastic body 18 is provided in at least a portion of the gap between the shaft portion 11C and the hole portion 17C. In the present embodiment, the visco-elastic body 18 fills the gap between the outer peripheral surface of the shaft portion 11C and the inner peripheral surface of the hole portion 17C.

In the damping tool 50 having the above described structure, only a small amount of the visco-elastic body 18 forming a damping element is present in the hole portion 17C of the weight member 17. However, the amplitude of the weight member 17 vibrating in resonance with the chatter vibration increases the further from the end 17A that is connected to the tool body 11. Therefore, the visco-elastic body 18 located within the hole portion 17C formed in the end 17B of the weight member 17 having a large amplitude is compressed by a large degree. For this reason, because the energy of the chatter vibration that is converted into heat increases, it is possible to obtain a sufficient damping effect even when only a small amount of the visco-elastic body 18 is employed, as in the fifth embodiment.

Figure 6:
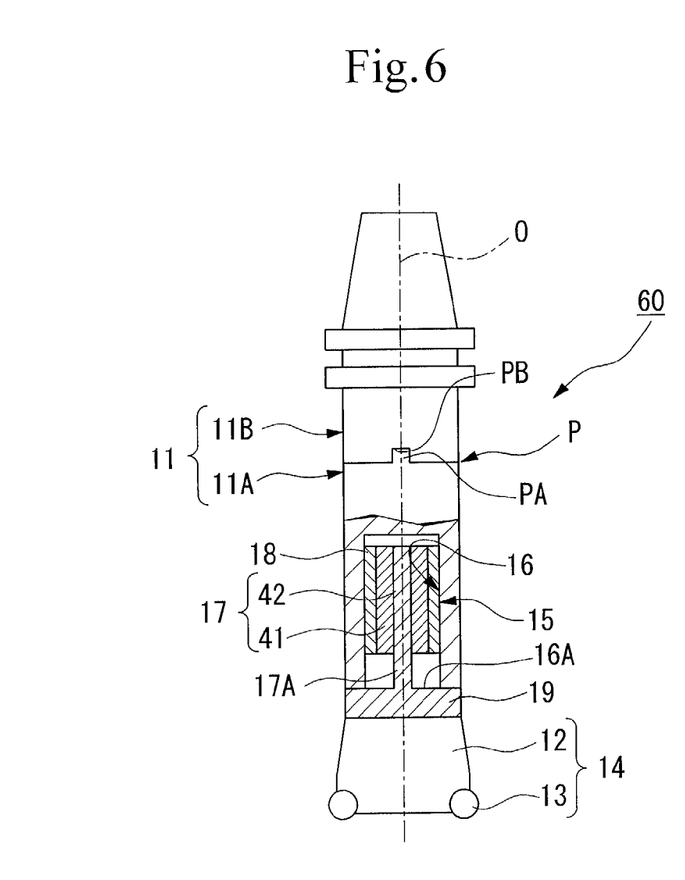
FIG. 6 is a partial sectional side view of the vibration damping tool according to the sixth embodiment of the present invention.

A description will now be given of the damping tool according to the sixth embodiment of the present invention. Portions thereof that are the same as in the above described first through fifth embodiments are given the same descriptive symbols and a description thereof is omitted. FIG. 6 is a partial sectional side view of the vibration damping tool according to the sixth embodiment.

As is shown in FIG. 6, the damping tool 60 according to the sixth embodiment has substantially the same structure as the damping tool 10 according to the second embodiment. The damping tool 60 differs in that the weight member 17 is formed from a high density material 41 having a density of 7.9 g/cm$^3$ or more, for example, from a heavy metal having a density of approximately 18 g/cm$^3$.

More specifically, the weight member 17 has a structure in which a high density material 41 formed from a heavy metal is wrapped around the circumference of a narrow diameter shaft portion 42 made from steel. The portion of the narrow diameter shaft portion 42 that is not wrapped with the high density material 41 is the end 17A connected to the inner wall surface 16A on the distal end side of the hollow portion 15.

According to the damping tool 60 having the above described structure, because it is possible using a smaller volume to achieve the same mass as when the entire weight member 17 is made out of steel, it becomes possible to reduce the volume of the hollow portion 15 to be formed in the tool body 11. As a result, the rigidity of the tool body 11 can be maintained at a high level and an even greater level of suppression of chatter vibration is made possible.

In this sixth embodiment, the weight member 17 of the damping tool 10 according to the second embodiment is formed from a high density material, however, it is also possible, for example, for the weight members 17 of the first, third, fourth and fifth embodiments to be formed from the high density material 41.

Figure 7:
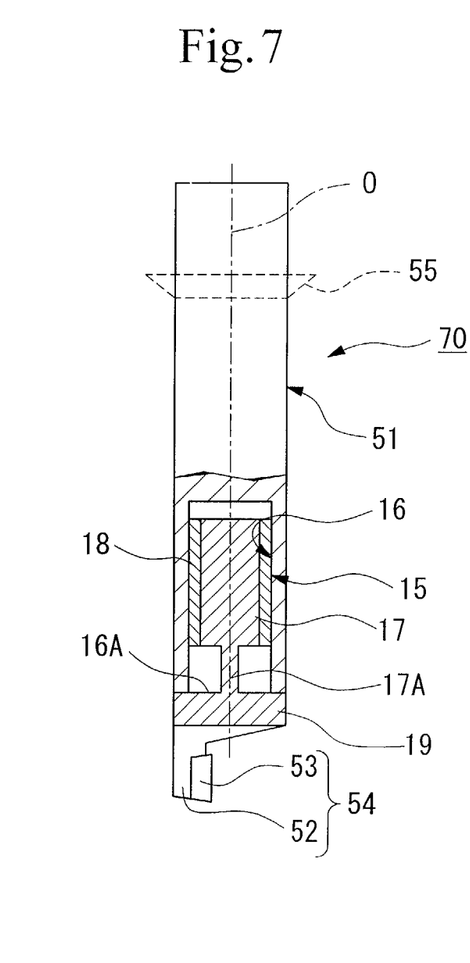
FIG. 7 is a partial sectional side view of the vibration damping tool according to the seventh embodiment of the present invention.
Figure 8A:
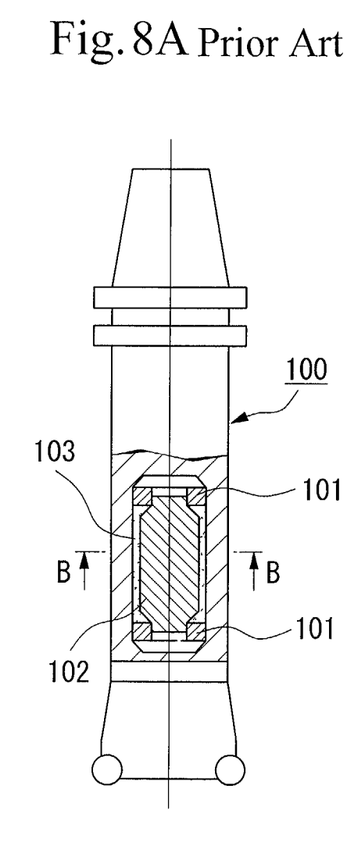
FIG. 8A is a partial sectional side view of a conventional vibration damping tool.
Figure 8B:
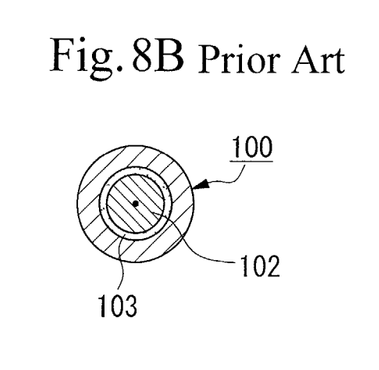
FIG. 8B is a cross-sectional view taken along the line B—B in FIG. 8A.

In the above-described first through sixth embodiments a description is given of when the present invention is applied in a rotation cutting tool. In the seventh embodiment of the present invention a description is given of when the present invention is applied in a turning cutting tool. Note that portions of the seventh embodiment that are the same as in the above described first through sixth embodiments are given the same descriptive symbols and a description thereof is omitted. FIG. 7 is a partial sectional side view of the vibration damping tool according to the seventh embodiment.

As is shown in FIG. 7, the damping tool 70 according to the seventh embodiment is a turning cutting tool that is formed mainly by a tool body 51 and a head portion 54 (i.e., a processing means). The tool body 51 has a substantially cylindrical configuration and is made from steel, for example. The tool body 51 also has a base end supported in a cantilever fashion by a gripping portion of a machine tool. The head portion 54 (processing means) has an insert 53 mounted on an angular distal end portion of a head body 52.

As is shown in FIG. 7, the head portion 54 is removably mounted by a connecting screw (not shown) on the distal end portion of the tool 51 coaxially with the axis O. The head portion 54 is mounted such that a cutting edge of the insert 53 protrudes on the distal end side of the damping tool 50.

Inside the distal end portion of the tool body 51 on which this head portion 54 is mounted is housed a dynamic vibration absorber formed by a visco-elastic body 18 and a weight member 17 having the same structure as in the above described second embodiment.

The damping tool 70 according to the seventh embodiment has the above described structure. When a cutting processing is performed on a rotating material to be cut using the cutting edge of the insert 53 mounted on the head portion 54, chatter vibration is generated in a direction orthogonal to the direction of the axis O of the tool body 54 due to the cutting force. At this time, the weight member 17 that is fastened to the inner wall surface 16A on the distal end side of the hollow portion 15 resonates, and a substantially opposite phase vibration from the vibration of the tool body 51 begins in a direction orthogonal to the axis O with the connected end 17A of the weight member 17 as the fixed end.

Consequently, the vibration of the weight member 17 is transmitted to the visco-elastic body 18 and is thereby damped. Ultimately, the chatter vibration of the tool body 51 is suppressed as a result of the energy of the chatter vibration being converted into progressive heat energy and dissipated.

It should be noted that, when the present invention is applied to a rotation cutting tool, as in the above first through sixth embodiments, the projecting length from the gripping portion of the machine tool to the cutting edge is always the same length, however, when the present invention is applied to a turning cutting tool, as in the seventh embodiment, when the turning cutting tool is mounted in the machine tool there are cases when the projecting length from the gripping portion of the machine tool to the cutting edge may be changed. In such cases, the undamped natural vibration of the tool body 51 changes and the concern arises that the damping properties of the dynamic vibration absorber that were assumed at the design stage may not be made apparent. Therefore, in the seventh embodiment, as is shown by the broken line in FIG. 7, for example, a stop member 55 that regulates the projecting length is installed in advance in the tool body 51. If this type of stop member 55 is used, in the damping tool 70 used as a turning cutting tool, the projecting length thereof can be prevented from changing. As a result, because there is also no change in the undamped natural frequency of the tool body 51, it is possible to provide a damping tool 70 having a dynamic vibration absorber whose properties are exactly as were intended in the design stage.

Here, as in the above first, third, fourth, fifth, and sixth embodiments, it is to be understood that, in the damping tool 70 of the seventh embodiment used as a turning cutting tool, it is also possible to use a weight member 17 formed as a substantially circular cylinder, to fix both ends of the weight member 17, to hollow out the interior of the end of the weight member 17 on the opposite side to the end 17A of the weight member that is connected to the inner wall surface 16A on the distal end side of the hollow portion 15, to form a shaft portion 11C on the tool body 11 and fill the visco-elastic body 18 into the gap between the shaft portion 11C and the hole portion 17C of the weight member 17, or to form the weight member 17 from the high density material 41. Moreover, it is also possible to employ a structure in which the tool body 51 can be divided and be freely removed from or reattached at a position on the base end side of the hollow portion 15.

What is claimed is:

1. A vibration damping tool comprising:
   a tool body provided at a distal end portion thereof with processing means for processing a material to be cut, said tool body having a hollow portion formed inside and defined by an inner wall surface, said tool body and said hollow portion extending along a longitudinal axis;
a base plate connected to the tool body at the distal end thereof at a first base plate surface to cover the hollow portion;
a longitudinally-extending weight member comprising a shaft portion integrally connected to and projecting from the first base plate surface of the base plate into the hollow portion, and a weight member portion having a larger diameter than that of the shaft portion and integrally connected to the shaft portion to extend toward yet disposed apart from the inner wall surface on a base end side of said tool body opposite said base plate, with a first gap formed at a radial distance from the longitudinal axis between said inner wall surface of the hollow portion and said weight member portion of said weight member and with a second gap formed at a rectilinear distance along the longitudinal axis between a distal end of the weight member portion and the base end side of said tool body; and
a visco-elastic body filled only into a portion or all of said first gap,
whereby said weight member and said visco-elastic body constitute a dynamic vibration absorber that damps and absorbs vibration of the tool body and
wherein the visco-elastic body is fabricated from a solid yet elastic material having a Young's modulus of not more than 1000 kPa, a hardness penetration of 20 to 300 based on $1/10$ mm, a tensile strength of 1 to 4000 kPa and an elongation of 50 to 800% and
wherein said hollow portion is formed so as to extend from said distal end portion along the longitudinal axis in an axial direction of the tool body with the processing means connected directly to a second base plate surface of the base plate, the second base plate surface being disposed opposite to the first base plate surface.

2. A vibration damping tool according to claim 1, wherein said one end of the weight member is formed as a narrow diameter shaft.

3. A vibration damping tool according to claim 1, wherein said tool body can be divided, and be freely removed from and reattached at a position on the base end side of said hollow portion.

4. A vibration damping tool according to claim 1, wherein said weight member is formed from a high density material.

5. A vibration damping tool comprising:
a tool body extending along a longitudinal axis and having a longitudinally extending hollow portion formed therein and defined by an inner wall surface;
a base plate provided at a distal end of said tool body and having a first surface and an opposite second surface, the base plate connected directly to the tool body at the first surface for covering the hollow portion;
a processing means that processes a material to be cut, connected directly to the second surface of the base plate;
a longitudinally-extending weight member comprising a shaft portion connected directly to the first surface of the base plate and extending into the hollow portion, and a weight member portion connected directly to said shaft portion to extend along the longitudinal axis toward yet disposed apart from the inner wall surface on a base end side of said tool body opposite said base plate and at a radial distance from the longitudinal axis to form a first gap with the inner wall surface and at a rectilinear distance along the longitudinal axis to form a second gap with the base end side of said tool body; and
a visco-elastic body disposed partially or entirely in only the first gap and forming an annulus between and in contact with said weight member portion of the weight member and the inner wall surface, the visco-elastic body fabricated from a solid yet elastic material.

6. A vibration damping tool according to claim 5, wherein the weight member is connected to the base plate as an integral construction.

7. A vibration damping tool according to claim 5, wherein the gap forms an annular opening surrounding the weight member as viewed in cross-section.

8. A vibration damping tool according to claim 5, wherein the visco-elastic body is fabricated from a material having a Young's modulus of not more than 1000 kPa, a hardness penetration of 20 to 300 based on $1/10$ mm, a tensile strength of 1 to 4000 kPa and an elongation of 50 to 800%.

9. A vibration damping tool according to claim 5, wherein the hollow portion is cylindrical in shape.

10. A vibration damping tool comprising:
a tool body provided at a distal end portion thereof with processing means for processing a material to be cut, said tool body having a hollow portion formed inside and defined by an inner wall surface, and closed by said processing means at a processing means base plate, said tool body and said hollow portion extending along a longitudinal axis;
a longitudinally-extending weight member comprising a shaft portion that connects directly to the processing means base plate and extends into said hollow portion of the tool body from said processing means, and a weight member portion that connects directly to said shaft portion and extends toward yet disposed apart from the inner wall surface on a base end side of said tool body opposite said processing means, with a first gap formed at a radial distance from the longitudinal axis between the inner wall surface of the hollow portion and said weight member portion of said weight member and with a second gap formed at a rectilinear distance along the longitudinal axis between a distal end of the weight member portion and the base end side of said tool body; and
a visco-elastic body filled only in a portion or all of said first gap,
wherein the visco-elastic body is fabricated from a solid yet elastic material and said weight member and said visco-elastic body constitute a dynamic vibration absorber that dampens and absorbs vibration of the tool body.

11. A vibration damping tool comprising:
a tool body provided at a distal end portion thereof with processing means for processing a material to be cut, said tool body having a hollow portion formed inside and defined by an inner wall surface, the processing means including a processing means base plate having a first base plate surface covering the hollow portion, said tool body and said hollow portion extending along a longitudinal axis;
a longitudinally-extending weight member comprising a shaft portion that integrally connects to the first base plate surface of the processing means and extends into said hollow portion, and a weight member portion that integrally connects to said shaft portion and extends toward yet disposed apart from the inner wall surface on a base end side of said tool body opposite the processing means, with a first gap formed at a radial distance from the longitudinal axis between said inner wall surface of the hollow portion and said weight member portion of said weight member and with a second gap formed at a rectilinear distance along the longitudinal axis between a distal end of said weight member portion of the weight member and the base end side of said tool body; and a visco-elastic body filled only into a portion or all of said first gap, wherein the visco-elastic body is fabricated from a solid yet elastic material, wherein said weight member portion comprises a cylindrical member having a substantially uniform inner diameter over its length and secured around said shaft portion, and wherein said weight member portion and said visco-elastic body constitute a dynamic vibration absorber that dampens and absorbs vibration of the tool body.

12. A vibration damping tool comprising:

a tool body extending along a longitudinal axis and having a longitudinally extending hollow portion formed therein and defined by an inner wall surface;

a base plate having a first surface and an opposite second surface, the base plate connected to the tool body at the first surface for covering the hollow portion;

a processing means that processes a material to be cut, connected to the second surface of the base plate;

a weight member including a first weight member portion connected to the first surface of the base plate and a second weight member portion connected to and surrounding the first weight member portion with the second weight member disposed apart from and between the base plate and a base end side of said tool body opposite the base plate, the first weight member portion extending into the hollow portion along the longitudinal axis toward yet disposed apart from the inner wall surface on the base end side of said tool body to form a cantilevered relationship with said base plate and at a radial distance from the longitudinal axis to form a gap between the inner wall surface and the second weight member portion, the first weight member portion fabricated from a first material and the second weight member portion fabricated from a second material higher in density than the first material; and a non-liquid, annularly-shaped visco-elastic body fabricated from a solid yet elastic material and occupying only a portion or all of the gap and being in simultaneous contact with the second weight member portion and the inner wall surface.

13. A vibration damping tool according to claim 12, wherein the second material has a density of at least 7.9 g/cm$^3$.

* * * * *